(12) United States Patent
Segall

(10) Patent No.: US 9,997,087 B2
(45) Date of Patent: Jun. 12, 2018

(54) TACTICAL COMBAT CASUALTY CARE TRAINING SYSTEM FOR HYPER-REALISTIC EMERGENCY MEDICAL TRAINING

(71) Applicant: Stuart Charles Segall, La Jolla, CA (US)

(72) Inventor: Stuart Charles Segall, La Jolla, CA (US)

( * ) Notice: Subject to any disclaimer, the term of this patent is extended or adjusted under 35 U.S.C. 154(b) by 480 days.

(21) Appl. No.: 14/667,450

(22) Filed: Mar. 24, 2015

(65) Prior Publication Data

US 2015/0199921 A1    Jul. 16, 2015

Related U.S. Application Data

(62) Division of application No. 13/898,436, filed on May 20, 2013, now Pat. No. 9,865,179.

(60) Provisional application No. 61/649,357, filed on May 20, 2012.

(51) Int. Cl.
*G09B 23/28* (2006.01)
*G09B 23/30* (2006.01)

(52) U.S. Cl.
CPC ........... *G09B 23/28* (2013.01); *G09B 23/285* (2013.01); *G09B 23/288* (2013.01); *G09B 23/30* (2013.01)

(58) Field of Classification Search
USPC ................ 434/262, 265, 267, 270, 274
See application file for complete search history.

(56) References Cited

U.S. PATENT DOCUMENTS

| | | | | |
|---|---|---|---|---|
| 3,106,040 A * | 10/1963 | Ostrander | ................ | A63H 3/24 264/278 |
| 4,439,162 A * | 3/1984 | Blaine | .................... | G09B 23/34 434/268 |
| 6,206,703 B1 * | 3/2001 | O'Bannon | ........ | G01M 17/0078 434/267 |
| 2004/0126746 A1 * | 7/2004 | Toly | ........................ | G09B 23/28 434/262 |
| 2007/0218438 A1 * | 9/2007 | Sanders | ................. | G09B 23/30 434/236 |
| 2008/0167398 A1 * | 7/2008 | Patil | ........................ | B32B 27/08 523/113 |
| 2009/0291421 A1 * | 11/2009 | Duprez | .................. | G09B 23/28 434/262 |

(Continued)

*Primary Examiner* — James Hull
(74) *Attorney, Agent, or Firm* — Gary L. Eastman, Esq.; Eastman & McCartney LLP

(57) ABSTRACT

The Tactical Combat Casualty Care Trainer For Hyper-Realistic™ Emergency Medical Training ("TCCC") of the present invention includes a tactical combat training device for the purpose of providing an emergency medical services provider hands-on training. The TCCC includes an artificial human skeleton having specific anatomical features which provide the trainee or provider with appropriate tactile response analogous to a real human patient, thereby increasing the fidelity of training and improving the skills necessary to conduct procedures such as cricothyrotomy, intraosseous infusion, CPR and other medical services to human patients. The skeleton is covered by a realistic coating that simulates human skin, which adds to the TCCC's training value. The TCCC also includes a removable trachea module and training pucks located at the sternum as well as the left and right proximal humeral heads to simulate the use of infusion-type devices.

14 Claims, 12 Drawing Sheets

(56) References Cited

U.S. PATENT DOCUMENTS

2012/0077169 A1* 3/2012 Takeda ................. G09B 23/288
434/267

* cited by examiner

TACTICAL COMBAT CASUALTY CARE TRAINING SYSTEM FOR HYPER-REALISTIC EMERGENCY MEDICAL TRAINING

RELATED APPLICATIONS

This application is a divisional of, and claims the benefit of priority to, the U.S. Utility patent application for "Tactical Combat Casualty Care (TCCC) Trainer For Hyper-Realistic™ Emergency Medical Training," Ser. No. 13/898,436, filed on May 20, 2013, which in turn claims the benefit of priority to the U.S. Provisional Patent Application for "Tactical Combat Casualty Care (TCCC) Trainer For Hyper-Realistic™ Emergency Medical Training," Ser. No. 61/649,357, filed on May 20, 2012.

FIELD OF THE INVENTION

The present invention relates generally to casualty simulation and medical response team training systems. The present invention is more particularly, though not exclusively, a Hyper-Realistic™ head and torso simulator to simulate injuries for purposes of tactical combat casualty care simulation and medical response training.

BACKGROUND OF THE INVENTION

The United States military spends hundreds of millions of dollars annually training thousands of Sailors, Marines, Soldiers, and Airmen for combat operations, while other civilian specialized first responder programs do the same for paramedics and other first responder teams. Because real world accidents, life and death situations, or combat situations are not always an effective or desirable manner to conduct for training events, simulation of events has long been an indispensable training tool.

Acquisition of expertise in any discipline requires practice. Simulation of combat situations minimizes costs; at the same time simulation provides military personnel and civilian first responders with realistic training scenarios. From armored vehicle and flight simulators to cardiopulmonary resuscitation (CPR) mannequins, the United States government conserves many resources by using computers and other training aids to simulate actual operational conditions allowing procedural training in a controlled environment. Simulators of all kinds minimize risk of loss of assets and save on fuel costs, ammunition, and even the lives of the very people being trained.

Combat medical or first responder teams are groups that benefit greatly from simulation. It is not practical, nor realistic, to expect Corpsmen, Medics, or Paramedics to hone their skills exclusively on real people in real life-threatening situations. Thus, individuals with such responsibilities derive significant training value from implementation of tactics, techniques, and procedures in a realistic, but simulated, operating environment, prior to being faced with a real world scenario. Many systems have been developed to fulfill necessary training requirements by simulation. A wide range of technologies are currently employed, from complex simulation environments that fully recreate an operating room experience, to computer programs and table-top equipment that allow technicians to rehearse medical decision-making and the performance of specific tasks.

Many of these systems are cost prohibitive due to the level of technology involved in the device. Further, many systems are too big, bulky, or are simply not conducive to mobility or training in the field. Due to the current state of the economy and the fiscally constrained environment within which government agencies continue to work, compact, less expensive, versatile, and realistic training aids are necessary to complete efficient and effective training of medical response personnel.

In light of the above, it would be advantageous to provide a compact, versatile, and portable injury simulation system that provides a realistic experience to emergency medical teams in a controlled training environment.

SUMMARY OF THE INVENTION

The Tactical Combat Casualty Care Training System ("TCCC") of the present invention provides a portable and versatile answer to on-the-ground training needs for military Corpsmen and Medics, and civilian first responder teams. The TCCC is comprised of a single Hyper-Realistic™ head and upper torso mannequin that allows for practicing at least the following six skill sets: (1) insertion of a Nasopharyngeal Airway ("NPA") for airway management; (2) performing head tilt, chin lift, visual inspection of mouth and physical sweep to remove foreign bodies from the mouth in support of airway management; (3) performing a surgical airway ("cricothyrotomy") for airway management; (4) performing needle chest decompression ("NCD") for tension pneumothorax; (5) insertion of an Intraosseous Infusion ("IO") System into the sternum; and (6) insertion of an IO System into the proximal humerus.

The TCCC of the present invention includes a tactical combat training device for the purpose of providing an emergency medical services provider hands-on training. The TCCC includes an artificial human skeleton having specific anatomical features which provide the emergency medical service trainee or provider with appropriate tactile response analogous to a real human patient, thereby improving the skills necessary to provide these medical services to human patients.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
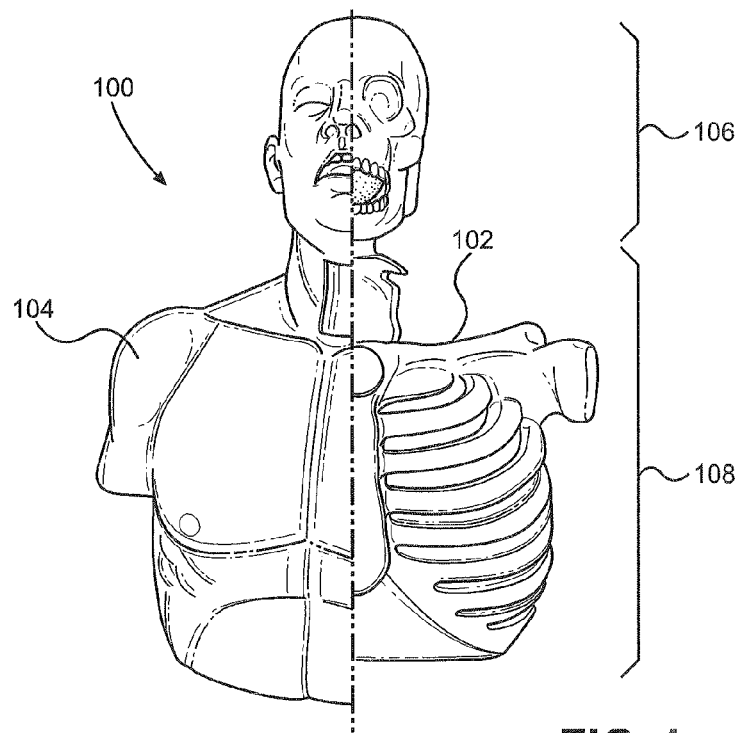
FIG. 1 is a front view of a preferred embodiment of the Tactical Combat Casualty Care Training System ("TCCC") of the present invention, showing the torso construction of the TCCC, with an articulable head, moveable jaw, and cutaway of the skin showing an anatomically correct skeletal construction.

Referring initially to FIG. 1, the Tactical Combat Casualty Care for the Hyper-Realistic™ Emergency Medical Training System ("TCCC"), of the present invention is shown and generally labeled 100. In a preferred embodiment, the TCCC 100 of the present invention includes an internal skeleton 102 (shown below) with a skin-like exterior ("skin") 104. Further TCCC 100 is formed with a head 106 and a torso 108. A cutaway of the skin 104 is shown in this Figure, providing a view of the internal skeleton 102. TCCC 100 incorporates a method and apparatus for simulating real world casualties in a training environment.

A preferred embodiment of TCCC 100 enables training in a number of particular tactical combat casualty care skill sets designed to target priority medical training procedures presently in demand, including but not limited to: needle chest decompression for tension pneumothorax, nasal and oral airway management, cricothyrotomy, and humeral and sternum intraosseous infusion and fluid delivery. It is to be appreciated by those skilled in the art that the preceding list of skill sets should not be considered limiting; rather the TCCC 100 of the present invention may be formed with any variety of priority skill sets practical for the application and feasible for training use.

In a preferred embodiment, the TCCC 100 has an anatomically correct internal and external human-like construction, featuring true-to-life look and feel, enhancing the Hyper-Realistic™ training simulations. TCCC 100 has an internal bone structure that comprises skeleton 102 (discussed below) and a two-part, liquid silicone, tin-based polymer rubber that is cast from a life-like mould to produce a skin-like exterior 104 that provides procedural task training with heightened realism. In a preferred embodiment, TCCC 100 can be adapted and equipped for execution of many other emergency medical procedures other than those listed above.

Figure 2:
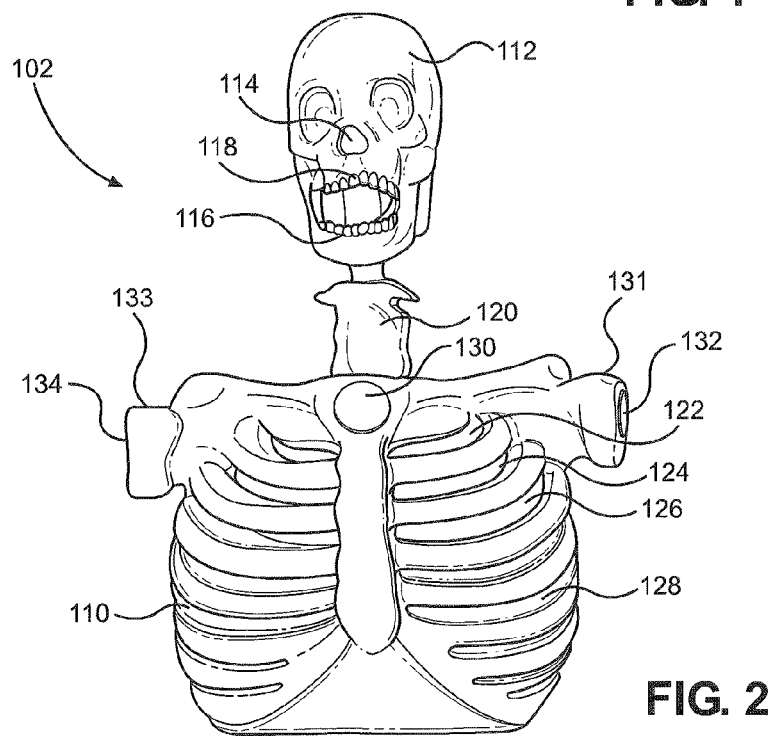
FIG. 2 is a front view of a preferred embodiment of the internal skeletal components of a preferred embodiment of the TCCC of the present invention showing the anatomically correct interior skeletal components, the location of the intraosseous infusion ("IO") training puck at the sternum, various intercostal spaces between the ribs for needle decompression procedure, and an articulable head, jaw, and neck for medical training procedures.

Referring now to FIG. 2 the internal skeleton 102 of the TCCC 100 of the present invention is shown with the skin 104 removed in order show the skeletal anatomy. A preferred embodiment of the skeleton 102 comprises a simulated skeleton of a human torso 108 that accurately models the bone structure of the human anatomy. Skeleton 102 has a rib cage 110, a skull 112, with an anatomically correct nasal cavity 114, and an articulable jaw 116 with full set of teeth 118, all mounted on a flexible cervical spine 120 permitting the skull 112 and spine 120 to articulate relative to the rest of the torso 108. The rib cage 110 has individual ribs (not individually labeled here) that define the first, second, third, and fourth intercostal spaces labeled 122, 124, 126, and 128 respectively on the TCCC's 100 left and right sides.

In keeping with the Hyper-Realistic™ theme, the skeleton 102 features an anterior-superior sternum intraosseous ("IO") puck ("sternum puck") 130 located at the junction of the ribs of the rib cage 110 at the chest. As will be discussed in more detail below, sternum puck 130 is user replaceable, being designed as a sacrificial target for the emergency medical training. Two humeral IO pucks 132 and 134 are formed similar to the sternum puck 130, and are located on either shoulder of the skeleton 102 at the left and right proximal humeral heads 131 and 133. It is to be appreciated by those skilled in the art that the skeleton 102 components and TCCC 100 as a whole can incorporate additional features and extremities to those listed.

The skeleton 102 is cast from, 4-Methylene diphenyl diisocyanate rigid polyurethane. It has a low density rigid urethane foam as a void filler. The skeleton has a weight and density approximating human anatomy. The flexure in the cervical spine 120 is provided through a flexible wire (not shown) embedded within the skeletal spine. The skeletal spine consists of the cervical spine 120, the thoracic spine 141, and the lumbar spine 142

Figure 3:
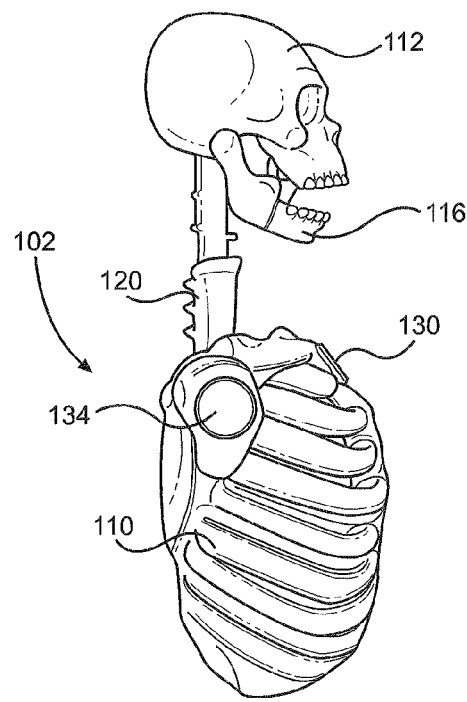
FIG. 3 is a side view of the internal skeletal components of the TCCC of FIG. 1, showing the location of a training puck at the proximal humerus for humeral IO training, the various intercostal spaces between the ribs, and an articulable head, jaw, and neck.

Referring now to FIG. 3, the right hand side of skeleton 102 is shown, with a clear view of the IO humeral puck 134 inserted, while a profile view of the sternum puck 130 is also visible. FIG. 3 further shows the skull 112 and jaw 116 that is hingeably attached to the skull 112, allowing some articulation similar to a real human jaw. The moveable jaw 116 in conjunction with the flexible cervical spine 120 provides additional realism allowing a trainee to practice procedures such as airway clearing, (described in detail below in reference to FIG. 13) or the head tilt/chin lift procedures while administering emergency medical assistance, such as cardio pulmonary resuscitation ("CPR").

The IO training pucks utilized at the sternum puck site 130 and left and right proximal humeral head pucks sites 132 and 134, are comprised of polycarbonate resin thermoplastic and a layer of polystyrene, fastened to the skeleton with silicone elastomer. The puck approximates human bone density and is useful for approximately ten to fifteen IO insertions before it needs to be replaced.

Figure 4:
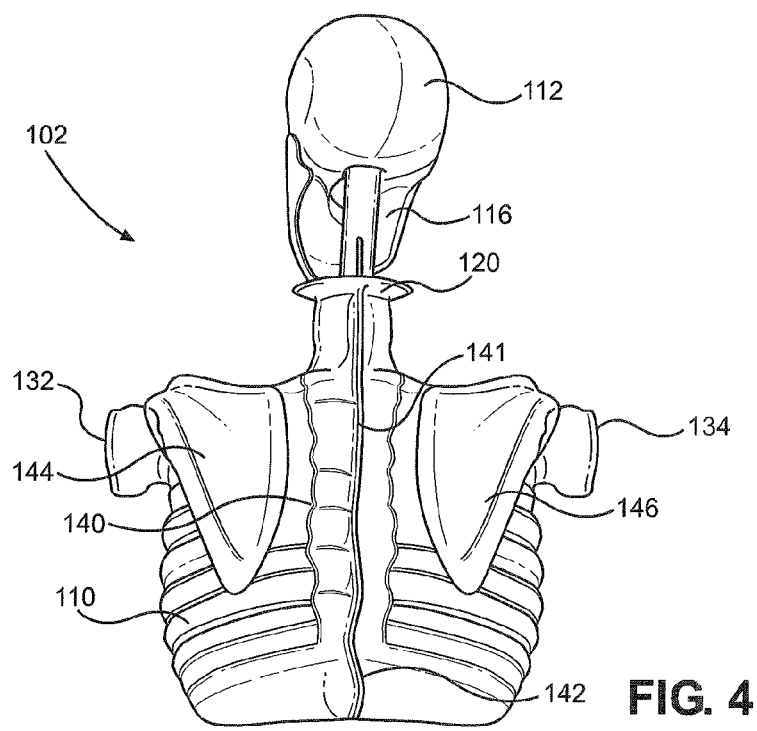
FIG. 4 depicts a back view of the internal skeletal components of the TCCC of FIG. 1, showing the internal skeletal components and the articulable neck vertebrae allowing for motion of the head relative to the torso, facilitating airway cleaning and other medical training procedures.

Referring now to FIG. 4, a back view of the skeleton 102 is shown, depicting the back of skull 112, the back of the jaw 116, and the cervical spine 120, in addition to many other features of the skeleton's 102 back 140. The thoracic spine 141 and lumbar spine 142 is further shown, in addition to left and right scapulae 144 and 146, respectively. The rib cage 110 is also accentuated in skeleton 102 and given individual contours in the back 140 in order to provide further anatomical landmarks ("landmarks") distinguishable through skin 104, for increased visual and tactile realism when a trainee manipulates the complete TCCC 100.

Identification of landmarks, musculature, and anatomical index points as a means of initiating casualty care is well known among those skilled in the art of medical procedure and assessment training and is meant to establish the location of the treatment area. Further references to anatomical index points, musculature, and landmarks are not specifically enumerated but are fully contemplated herein.

While the use of flexible resin as a method to facilitate airway clearing and fabricate the skeletal body 100 is particularly well suited for the TCCC of the present invention, it is to be appreciated that other construction materials and methods of facilitating airway clearing may be incorporated herein without departing from the scope of the present invention.

Figure 5:
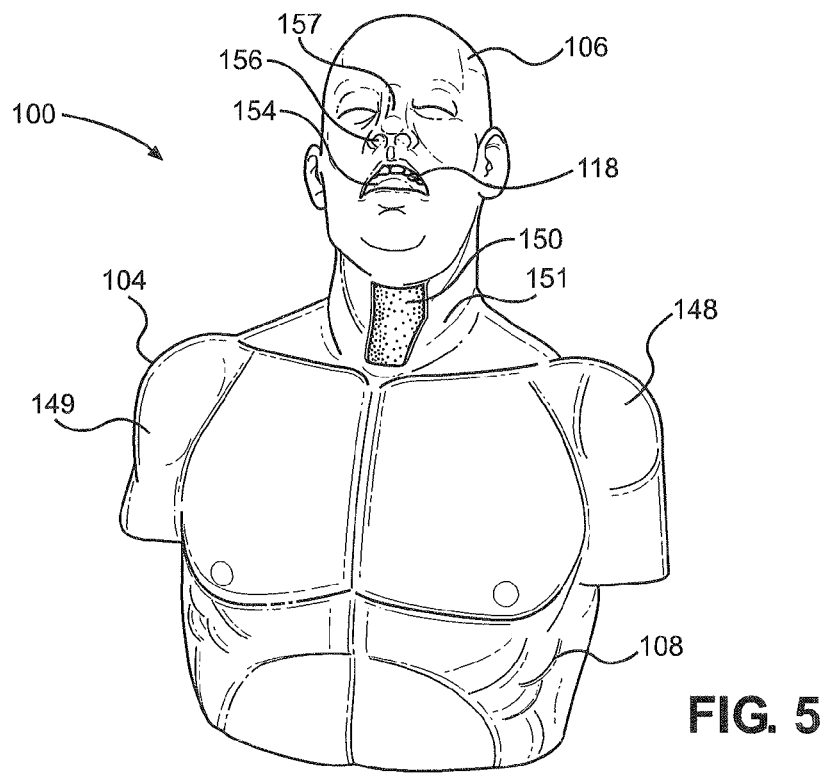
FIG. 5 is a front view of a preferred embodiment of the TCCC of FIGS. 1-3 with the exterior features and the skin-like covering resembling a human patient installed, showing the tracheal insertion area sized to receive a trachea training aid.

Now referring to FIG. 5, a TCCC 100 of the present invention is shown with the skin 104 formed over the skeleton 102, providing a realistic human torso 108, head 106, left shoulder 148 and right shoulder 149. The jaw 116 is articulated downward, leaving the mouth 154 slightly agape, revealing a complete set of teeth 118, adding to the realism of the simulation.

Skin 104 is made of a repairable two-part, liquid silicone, tin-based polymer rubber composition that is resilient, yet pliable, allowing a trainee to identify portions of the skeleton 102 beneath the skin 104 as the trainee conducts medical procedures. The skin 104 completely covers the front and back of the TCCC 100, allowing use of the entire torso 108 and head 106.

In an embodiment, specific multiple layers of skin 104 with different densities and weights are applied to the exterior of the skeleton 102, providing a way to simulate human musculature, which also serves as anatomical landmarks during medical procedures.

During construction of the TCCC, the skeleton 102, the skull 112, and the cervical spine 120, is placed inside the mold for the skin. Voids for the nasal and oral passages are created by placing removable plugs into the void area. Rib intercostals voids are sealed with polyethylene plastic resin sheets. The mold is then filled with a two-part, liquid silicone, tin-based polymer rubber to cast the head and torso as a single unit. After casting, the plugs for the oral and nasal passages are removed.

Figure 6:
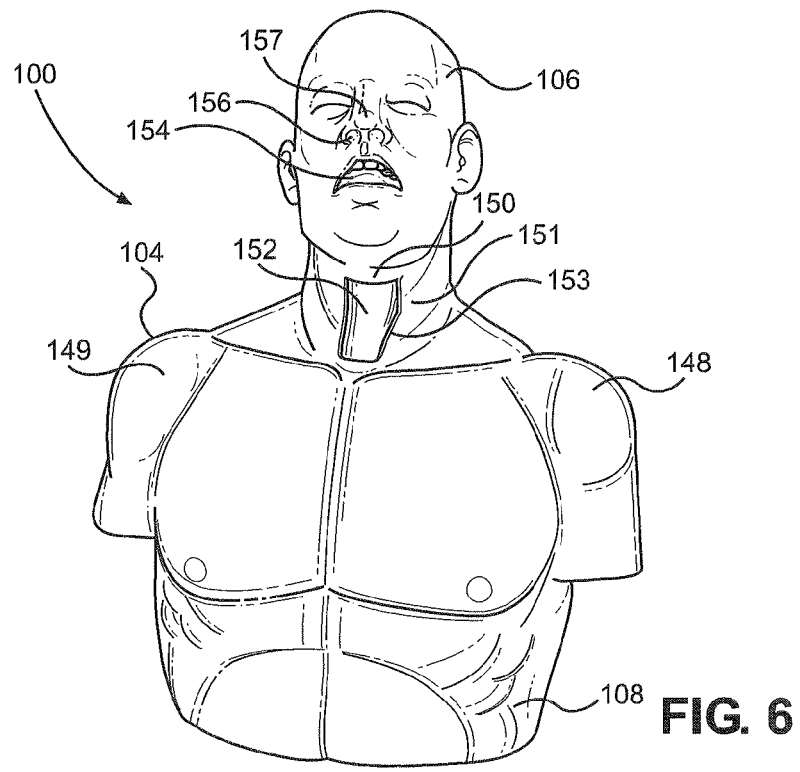
FIG. 6 is a front view of the preferred embodiment of FIG. 4, showing a trachea training aid installed in the tracheal insertion area, and the articulable head and jaw, allowing airway cleaning and management procedures and breathing tube insertion for medical training.

A trachea module insertion area 150 is formed in the neck 151 between the head 106 and torso 108 of skin 104 and is sized to receive an anatomically similar trachea module 152 (shown in FIG. 6). The user-replaceable, user-repairable trachea module 152 allows simulation of emergency medical procedures, specifically a cricothyrotomy and surgical intubation.

Now referring to FIG. 6, a trachea module 152 has been inserted into the trachea module insertion area 150 for use in simulation. In use, the trachea module 152 is held in place by a lip of skin material 153 around the periphery of the insertion area 150 to secure it. In a preferred embodiment, the trachea module 152 is also constructed from silicone, rubber, plastics, and other materials, providing a realistic, tactile experience for the user. Such a construction allows for realistic feedback for users when palpating index points such as the laryngeal prominence (Adam's Apple) 168, and making incisions on the simulated cricothyroid membrane 170, both described in FIG. 10. The simulated skin 104 includes an open mouth 154 and an open nasal passage 156 in the nose 157 for airway check and breathing tube insertion described in further detail below.

Figure 7:
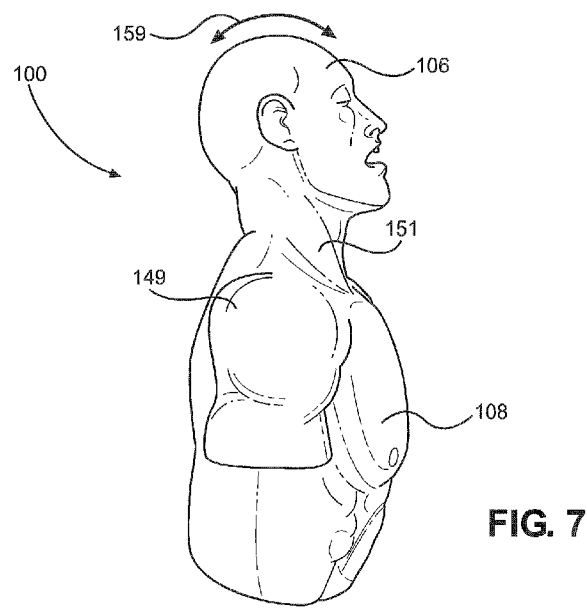
FIG. 7 is a side view of the preferred embodiment of FIG. 4, showing the anatomically correct simulated human torso and head with accurate anatomical landmarks and access to the open mouth and nasal cavity for medical training.

Now referring to FIG. 7, a right side view of the TCCC 100 is shown, looking at the right shoulder 149. The anatomically similar musculature for the simulated skin 104 is shown to extend to the side and back of the TCCC 100 of the present invention possessing proper anatomical landmarks for medical assessment and procedure training. The arrows indicated by designator 159 indicate the fore and aft flexibility of the head 106, simulating a real patient.

Figure 8:
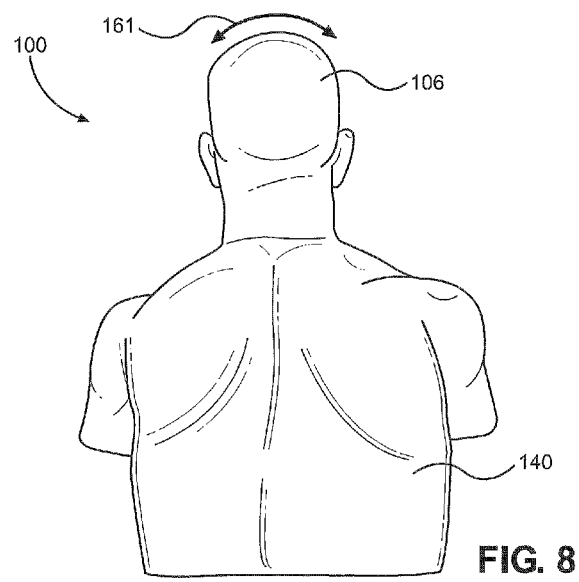
FIG. 8 is a back view of the preferred embodiment of FIG. 4, showing the anatomically correct simulated human torso with accurate anatomical landmarks on the back for medical training.

Now referring to FIG. 8, the back of the TCCC 100 is shown, again with anatomically correct musculature and skin 104 definitions. Head 106 may further move in direction 161, or left and right, simulating a real patient. The head 106 of the TCCC 100 may further rotate slightly (direction not shown).

Figure 9:
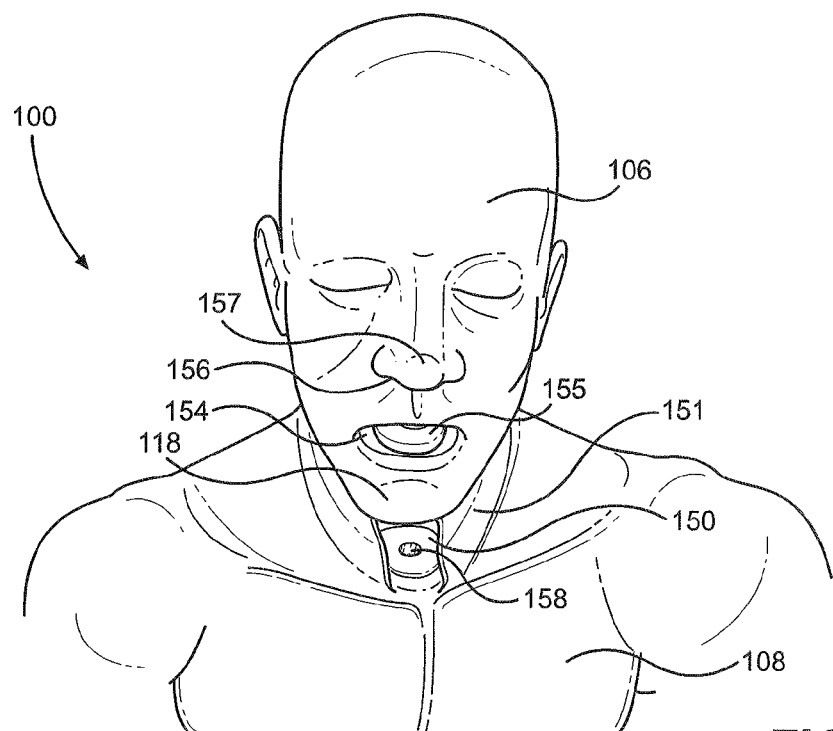
FIG. 9 is a close up front view of the preferred embodiment of FIG. 4, showing the airway hole at the bottom of the tracheal insertion area that connects to the trachea training aid for surgical airway procedures, and the articulable mouth and tongue for medical training.

Now referring to FIG. 9, a close up of the head 106 and the upper torso 108 is shown, focusing on the trachea module insertion area 150 and the open mouth 154. A bottom airway hole 158 is formed in the bottom of the trachea insert area 150, and top airway hole 159 (not visible from this angle) is formed in the top. Similarly, the trachea module 152 (see FIG. 10) has a central lumen 160 (not shown) providing a continuous path from the nasal passage or mouth, anatomically similar to a human trachea, in use. This function of the TCCC 100 allows insertion of a breathing tube (described below) as would be accomplished during an intubation procedure through the nasal passage, mouth, or via cricothyrotomy.

The open mouth 154 contains a tongue 155 for natural airway check. The tongue is made from a two-part liquid silicone to form a semi-rigid foam organ that is affixed to the mouth with a sealant, such as, for example, silicone.

Figure 10:
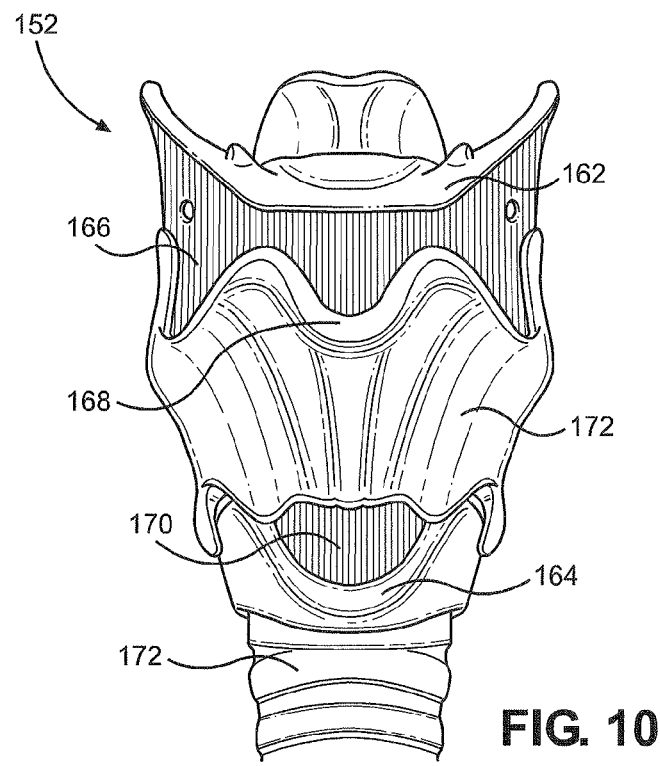
FIG. 10 is a diagrammatic view of a of the trachea training aid and the anatomical structure of a portion of a human neck, showing the location of the laryngeal prominence, thyroid cartilage, the cricothyroid membrane, and cricoid cartilage that overly the trachea.

Now referring to FIG. 10, a perspective view of the trachea module 152 is shown. Trachea module 152 is formed as a flexible tubular structure, having a central lumen 160 that is continuous through the center of the trachea module 152 from the top 162 at the [simulated] hyoid bone, to the bottom 164 where the [simulated] cricoid cartilage meets the rest of the trachea as it progresses toward the lungs (not shown). When inserted in the trachea insertion area 150, the top 162 of trachea module 152 is adjacent to the top airway hole 159 (not shown), while the bottom 164 of the trachea module 152 is adjacent to the bottom airway hole 158, providing the continuous passage from mouth 154 and nasal cavity 114 through the trachea module 152, and into the torso 108 of TCCC 100, through bottom airway hole 158.

Trachea module 152 is formed with the various components of a real human trachea, including a thyrohyoid ligament 166, laryngeal prominence 168 (or Adam's Apple), cricothyroid membrane 170, and thyroid cartilage 172. In reality, bones, cartilage, and connective tissue each have a different texture and strength. In order to provide the Hyper-Realistic™ level of training, a preferred embodiment of the trachea module 152 can be made with different density polymers or elastomers in order to give an anatomically correct look and feel to the component. It is to be appreciated by those skilled in the art that other suitable materials providing a high degree of realism can be utilized to manufacture such components.

Figure 11:
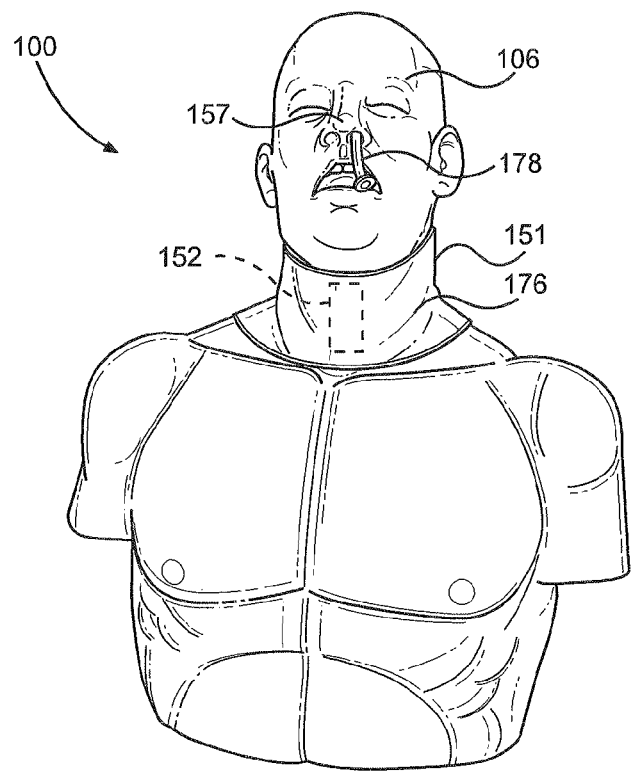
FIG. 11 is a front view of the preferred embodiment of the TCCC of FIGS. 4-8, showing the neck skin applied to the neck of the TCCC and points of access to airways in the mouth and nasal cavity, depicting the nasal breathing tube partially inserted into the TCCC nasal passage as would be completed during nasotracheal intubation training.

Referring now to FIG. 11, a preferred embodiment of the TCCC 100 of the present invention is shown with simulated neck skin 176 installed. Neck skin 176 covers the trachea module 152 (shown in dashed lines) providing an appropriate simulation for a trainee conducting an exercise. Neck skin 176 further conceals the trachea module 152 and requires a trainee to palpate the neck 151 of TCCC 100 to manually find the appropriate locations to incise, in the case of a cricothyrotomy, for instance.

FIG. 11 further shows a commercially manufactured nasopharyngeal airway ("nasal airway") 178 inserted at the nose 157 through the nostril 156 into the nasal cavity 114, proceeding into the nasal pharynx (not shown). The nasal airway 178 can be any standard commercially available nasopharyngeal airway. The nasal airway 178 is inserted through the nostril into the nasal cavity 114, proceeding into the nasal pharynx, and into the trachea module 152, as it would in reality, providing a realistic simulation of airway management.

Figure 12:
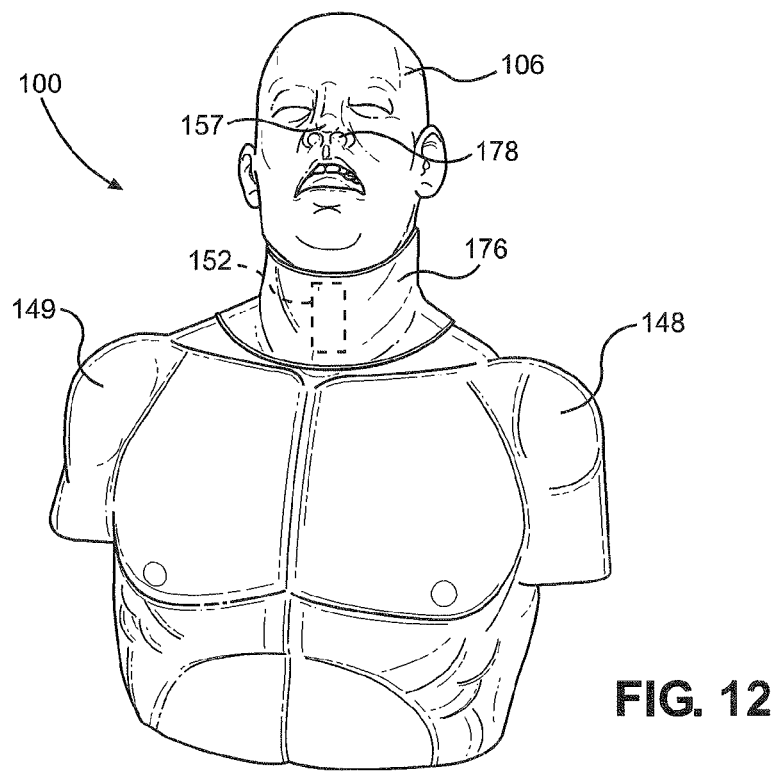
FIG. 12 is a front view of the preferred embodiment of the TCCC of FIG. 9, showing the nasal breathing tube completely inserted into the left nostril of the TCCC.

Now referring to FIG. 12, the nasal airway 178 is completely inserted into the nasal cavity, providing a realistic simulation of a nasal intubation.

Figure 13:
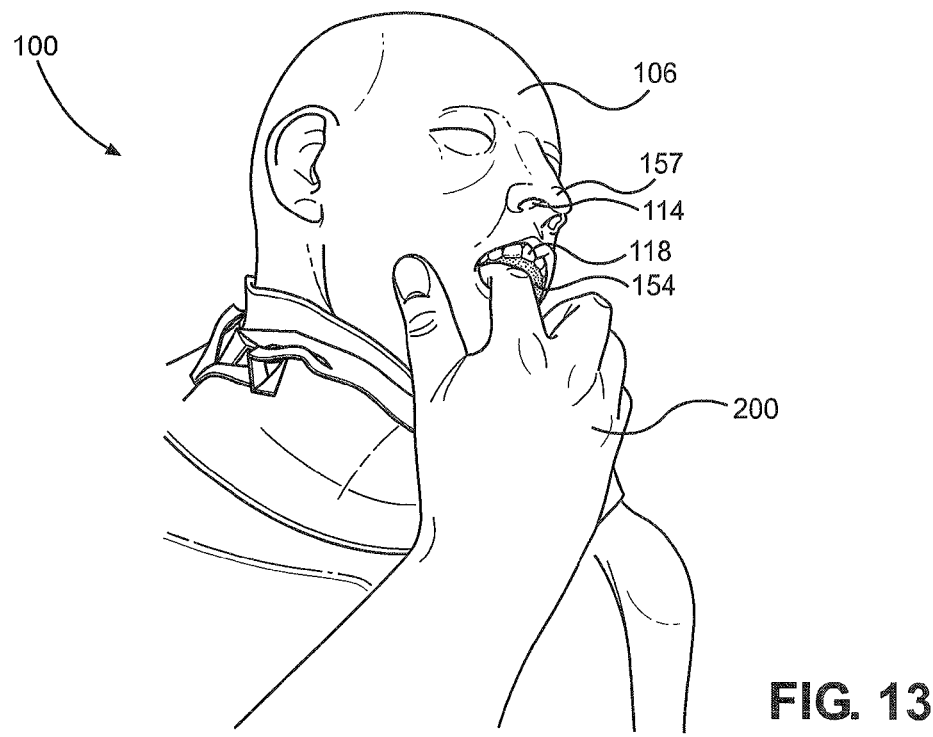
FIG. 13 is a close up front view of the TCCC of FIG. 9, showing the articulable head rotated to the side with the mouth open, allowing a trainee to clear the airway of any simulated foreign bodies during medical procedures training.

Referring now to FIG. 13, TCCC 100 is shown with a trainee 200 executing an oral sweep of the TCCC's 100 mouth 154. In a preferred embodiment, the tongue 155 (not visible in this Figure) as shown in FIG. 9, is formed of an elastomeric material that closely replicates the look and feel of a real human tongue. In a given medical training scenario, the trainee 200 may be required to extract a foreign object from the mouth of the TCCC 100 prior to oral intubation. This Figure is representative of such a procedure.

In a preferred embodiment, the flexibility of cervical spine 120 and neck 151, and jaw 116 provide the ability to manipulate the mouth 154 and provide the ability to perform "head tilt/chin lift" procedures for visual inspection of the mouth 154 and a physical sweep to remove foreign bodies in support of airway management or CPR. Due to the flexibility of cervical spine 116, skull 112 has a moderate articulation 159 and 161, allowing a trainee 200 to manipulate the skull 112 and head 106 as required by a given scenario. This flexibility, in conjunction with the force of gravity, simulates the lack of head control of an unconscious patient. The medical trainee 200 may then perform a head tilt/chin lift by utilizing the freedom of movement of skull 102 and the flexible spine 116. In an embodiment, the skull 102 may further be weighted to accurately model a typical human head.

Figure 14:
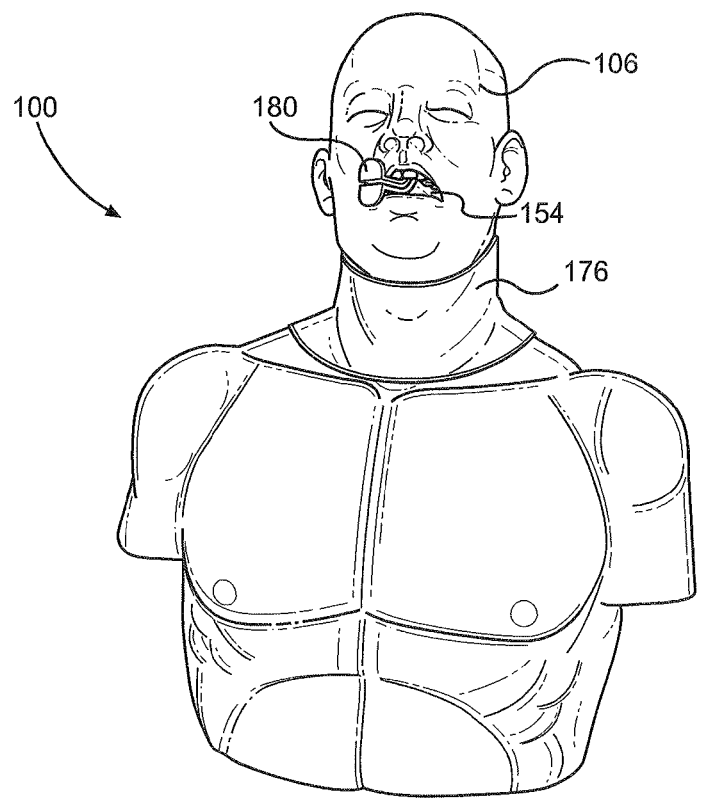
FIG. 14 is a front view of the TCCC of FIG. 9 showing an orotracheal breathing tube inserted in the mouth of the TCCC as would be completed during orotracheal intubation training.

Referring now to FIG. 14, once the airway check has been performed, a manufactured oral airway 180 may be inserted to facilitate and support airway management. The mouth 154 allows the trainee 200 to conduct intubation training, where the TCCC 100 of the present invention is shown with a full oral intubation completed. In an embodiment, the oral airway 180 is a commercially available orotracheal device such as the TaperGuard™ Evac Oral Tracheal Tube. Alternative training methods and devices for oral airway management are well known to those skilled in the art and are fully contemplated herein.

In a preferred embodiment, when conducting simulated intubation procedures with either the nasal airway 178 or oral airway 180, the instrument is inserted into a respective orifice in the TCCC's 100 head 106. In order to simplify TCCC 100 construction, the distal ends of airways 178 and 180 penetrate their respective orifices and enter the nasal cavity 114 within skull 112. This allows realistic medical training simulation even though the airways 178 and 180 do not actually enter the appropriate anatomical nasal passageways or the trachea.

In an alternative preferred embodiment, additional internal construction within the skull provides further Hyper-Realistic™ training, allowing the nasal airway 178 or oral airway 180 in use to follow a correct anatomical path from either the nose 157 or mouth 154 into the trachea module 152. In such an embodiment, the interior of the skull 112 is formed with specific pathways, replicating the human oral cavity, palate, nasal passageways, epiglottis, and esophagus (not shown), allowing either a nasal intubation or oral intubation.

Figure 15:
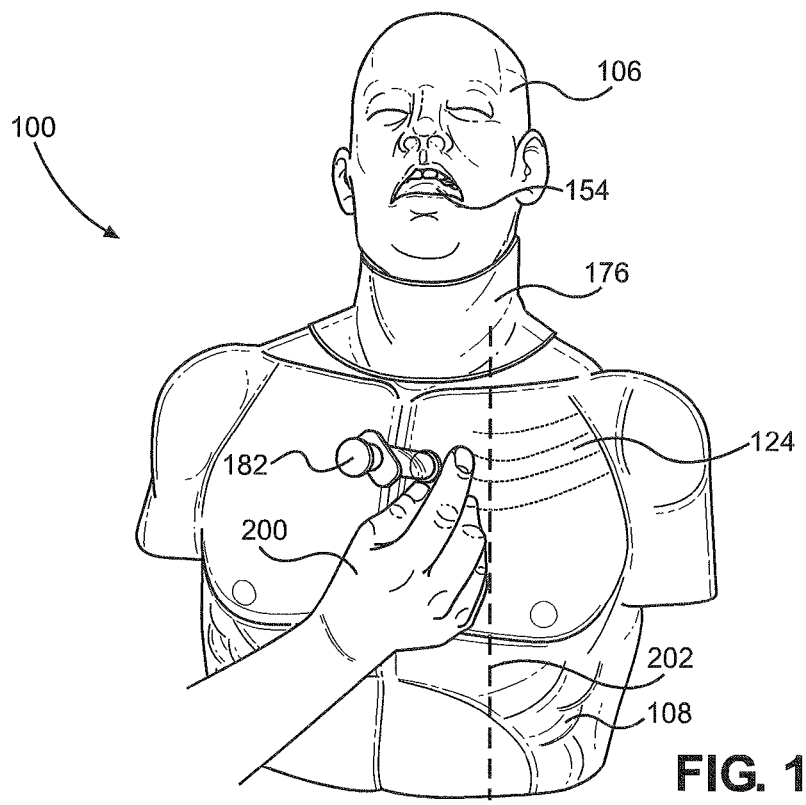
FIG. 15 is a front view of the TCCC of FIG. 9 showing a trainee's preparation for insertion of a needle and catheter into the chest cavity of the TCCC through an intercostal space, as would be completed during a chest needle decompression procedure of a pneumothorax.

Now referring to FIG. 15, needle chest decompression (NCD) for tension pneumothorax training ability of the TCCC 100 is demonstrated. In an embodiment, the intercostal spaces 122, 124, 126, and 128 accommodate anterior thoracic needle catheters for tension pneumothorax treatment procedures.

In preparation for insertion of a standard 14-gauge, 3 inch needle and catheter 182, a trainee 200 physically locates the appropriate intercostal space 124 within rib cage 110. In a preferred embodiment, this is easily accomplished as the TCCC 100 of the present invention includes essential landmarks such as the clavicle, ribs, and other appropriate anatomical structures tactilely distinguishable by the trainee 200. As is known in the art, during an NCD, the trainee locates the midclavicular line, represented by a dashed line 202 and the second intercostal space 124, which will be the insertion point for the needle and catheter 182. This device is capable of accepting up to a 14 gauge, 3¼ inch over-the-needle catheter.

Figure 16:
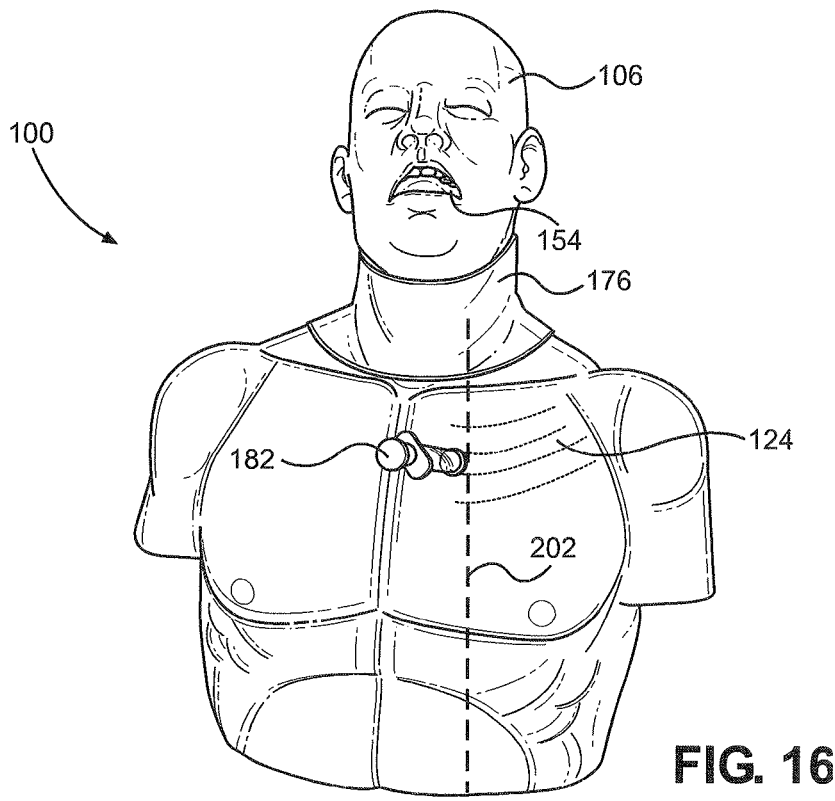
FIG. 16 is a front view of the preferred embodiment of the TCCC of the previous Figures, showing a needle and catheter inserted into the chest cavity of the TCCC through the intercostal space, as would be completed during a chest needle decompression procedure of a pneumothorax.

Referring to FIG. 16, the needle and catheter 182 are inserted into the TCCC's 100 chest at the second intercostal space 124 to complete the training evolution. After ensuring the needle entry site is not medial to the nipple line, the trainee will slowly advance the needle and catheter 182 into the simulated thoracic cavity of the skin 104 until the tip of the needle gives way upon entering the simulated pleural space (not shown) of the skeleton 102. The needle is removed leaving the catheter hub in place and stabilized by gauze tape (not shown).

In an embodiment, the TCCC 100 skeleton 102 can further be constructed with a tough, membranous material on the interior of the skeleton, beneath the skin 104 to simulate the pleura space of the human anatomy. In reality, there is a perceptible "pop" as a needle penetrates the parietal pleura, or the outer layer of the pleural cavity that lies against the interior of the chest wall. A membranous layer on the interior of the skeleton 102 adds further realism to the simulation.

Other thoracic needle catheters are commercially available for training, are well known among those skilled in the art, and are completely contemplated herein. For example, in an alternative embodiment, a 16 or 18 gauge needle and catheter may be used to extend the lifetime of the skin covering 104.

Figure 17:
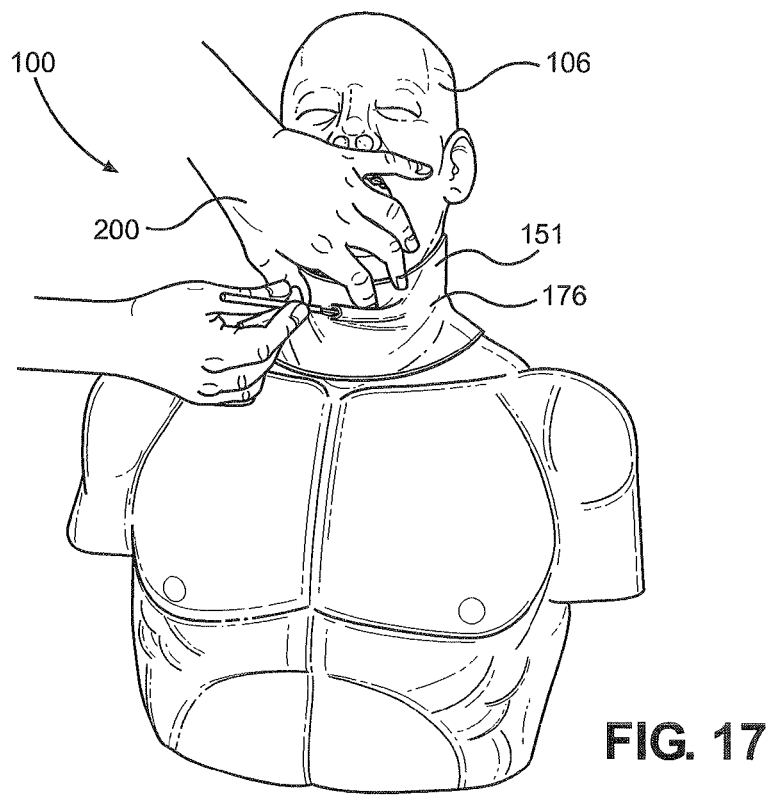
FIG. 17 is a front view of the preferred embodiment of the TCCC of previous Figures, showing a trainee utilizing the anatomically correct features to visually and manually identify anatomical landmarks of the TCCC to allow a correct incision during the establishment of a surgical airway as would be completed during a cricothyrotomy.

Now referring to FIG. 17, the capability of the TCCC 100 of the present invention to simulate performing a Hyper-Realistic™ surgical intubation, or cricothyrotomy for airway management is demonstrated. A cricothyrotomy is necessary when orotracheal or nasophangeal intubations are not practical due to foreign body airway obstruction, laryngeal edema caused by thermal injuries, and facial injuries resulting in airway distortion.

The entry point for an emergency cricothyrotomy is the cricothyroid membrane 170, a soft depression between hard thyroid cartilage 172 and cricoid cartilage 164 and must be identified by locating the laryngeal prominence 168. Because injury to the highly vascular thyroid gland (not shown) may cause hemorrhaging, persistent training and proficiency evaluation is vital to realize successful surgical airway management.

A cricothyrotomy procedure can be conducted in multiple ways, as is known in the art. For example, an "open cricothyrotomy," which includes an incision through the cricothyroid membrane with a scalpel and placement of an endotracheal ("ET") tube or tracheostomy tube can be simulated. In a prototypical cricothyrotomy, the skin at the neck just below the laryngeal prominence 168 is cut vertically to expose the cricothyroid membrane 170. The cricothyroid membrane 170 is then cut horizontally providing access to the interior of the trachea 174 for insertion of a manufactured airway such as an ET tube or as known in the art.

Alternatively, a "percutaneous cricothyrotomy," involving a needle and introducer/dilator (not shown) to pierce through the cricothyroid membrane can be conducted using the TCCC 100 of the present invention. In both procedures, the anatomical landmarks of the TCCC 100 are critical, providing the required indications of proper procedures training.

In a preferred embodiment, trachea module 152 is anatomically similar to human trachea, with the same or similar texture and contours. These characteristics can be visually and physically identified as landmarks for initial surgical airway incision as described above. Identifying locations of landmarks by physical means can be accomplished by applying hand 204 to the neck skin 176 to palpate the neck 151 in order to locate the laryngeal prominence 168, or other appropriate landmark, as required.

Figure 18:
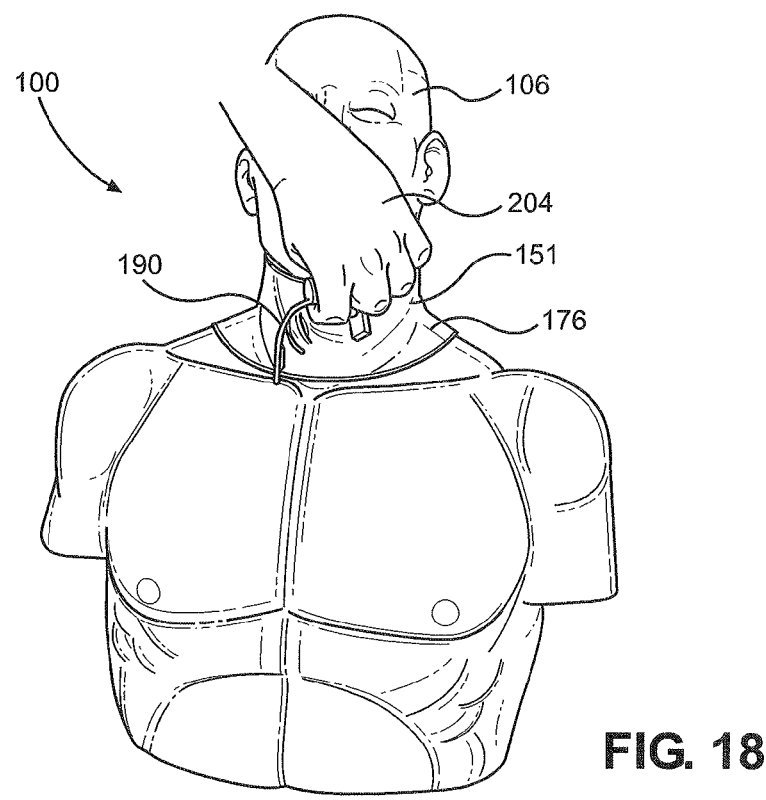
FIG. 18 is a front view of the preferred embodiment of the TCCC of previous embodiments showing the insertion of a manufactured airway through the incision made in the cricothyroid membrane into the trachea as would be conducted during a surgical intubation.

Referring now to FIG. 18, once the appropriate incisions are made, access to the trachea module 152 is possible through the simulated cricothyroid membrane 170. A manufactured airway 190 is prepared and inserted into the incision on the neck skin 176 through the cricothyroid membrane 170 into trachea module 152, analogous to an identical procedure on a real human in similar distress.

In a preferred embodiment, the manufactured airway 190 may be a commercially available surgical intubation kit. A variety of intubation kits can be incorporated into the manufactured airway of the present invention, and are fully contemplated herein.

Figure 19:
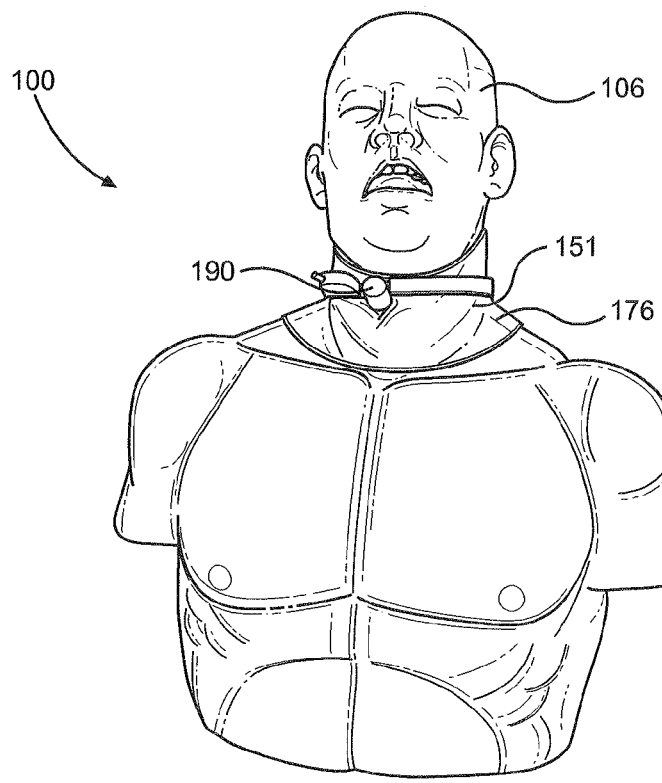
FIG. 19 is a front view of the preferred embodiment of the TCCC of FIG. 19, showing manufactured airway inserted into the trachea and secured to the neck of the TCCC as would be conducted during a surgical intubation.

FIG. 19 illustrates the above mentioned manufactured airway 190 having been prepared and inserted fully through the neck skin 176 and into the trachea module 152. After complete insertion into the trachea module 152, the manufactured airway 190 is fastened around the neck 151 and firmly held in place to provide reliable airway management. The TCCC 100 of the present invention includes the capability to train medical personnel in other alternative surgical or tracheal intubation procedures and skills related to cricothyrotomy, which are well known among those skilled in the art and are fully contemplated herein.

Figure 20:
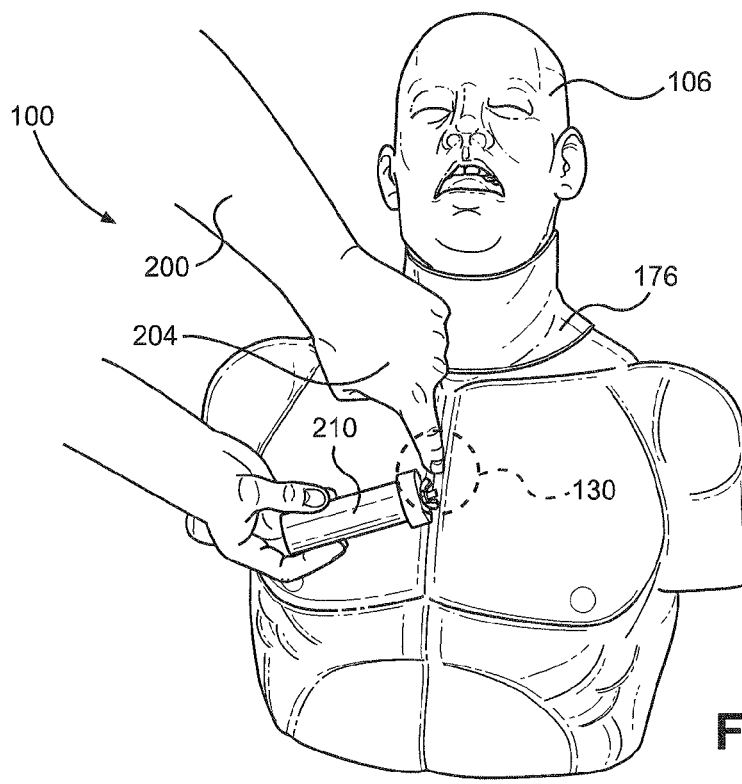
FIG. 20 is a perspective view of the preferred embodiment of the TCCC of previous embodiments showing the use of the anatomically correct features of the TCCC to visually and manually identify anatomical landmarks to facilitate proper sternal interosseous infusion system (IO device) placementon the sternum of the TCCC during training.

Referring to FIG. 20, the trainee 200 is preparing an intraosseous infusion ("IO") device 210 for use on TCCC 100. Patients with traumatic or life-threatening injuries often require immediate intravenous access for the delivery of medications and for fluid replacement including blood and blood components. Obtaining intravenous access may become impossible because of collapsed peripheral blood vessels and hypovolemia. IO infusion is one method by which medical professionals are capable of delivering fluids and required medications to individuals with such conditions. As is known in the art, the sternum, humerus, and tibia are three locations within the human body that are both accessible and well-suited for such a procedure. This is because these particular bones are comprised of soft, sponge-like cancellous bone (trabueculae), in the middle, a loose bone lattice filled with bone marrow and commonly referred to as the medullary canal. A hard compact bone surrounds the medullary canal, which provides the structural strength of the bone. The composition of the bones and the various canals throughout haversian canal (Volkmann canals) secure a direct delivery access route to central vascular circulation. Thus, introduction of fluids and medication to the medullary canal flows directly through the vascular plexus of the bones to the larger vascular system.

Commercial systems for sternum applications and the Bone Injection Gun for alternate IO delivery points are usable with the TCCC 100. In a preferred embodiment, the TCCC 100 of the present invention accommodates placement of IO infusion devices in two of the three above mentioned bones: sternum and humerus. It is to be appreciated by those skilled in the art that these options should not be considered limiting, as further addition of a leg (for tibia IO) or other extremities is possible without departing from the scope or intent of the present invention.

The trainee 200 uses a hand 204 to physically locate the sternum for insertion of an IO device 210. This is done by palpating the skin 104 of the torso 106, in order to find the appropriate landmarks in the chest and locate the sternum, or in the case of the TCCC 100, the sternum puck 130.

Figure 21:
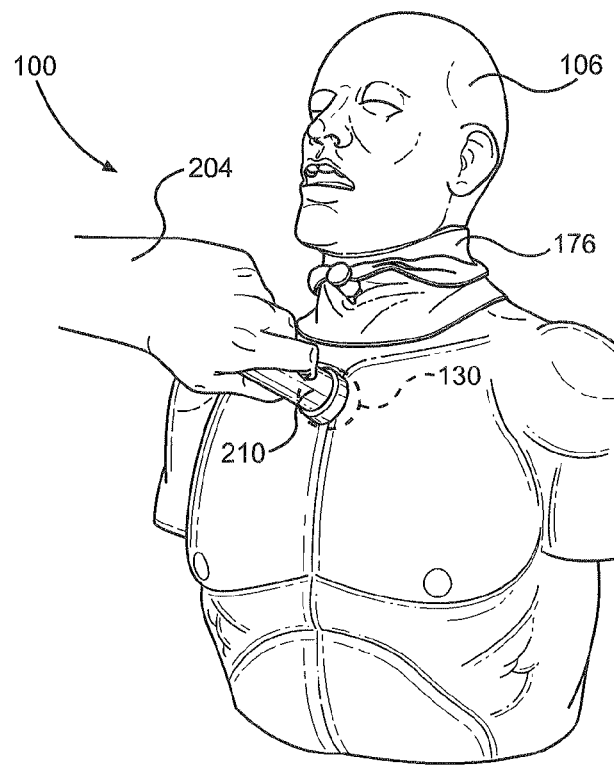
FIG. 21 is a perspective view of the preferred embodiment of the TCCC of previous embodiments showing the application of a sternal IO device to the chest of the TCCC.

FIG. 21 shows the trainee 200 introducing the IO device 210 to the sternum puck 130 of the TCCC 100. The sternum puck allows the user to feel the introduction of the IO device as it is introduced into the puck.

Figure 22:
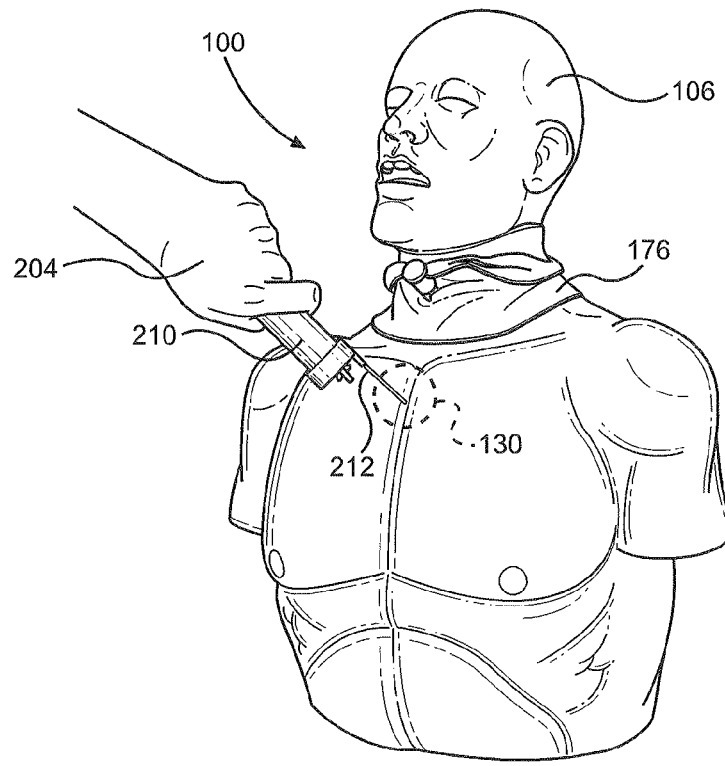
FIG. 22 is a perspective view of the preferred embodiment of the TCCC of previous embodiments showing a catheter that remains in place within the chest of the TCCC, following removal of the sternal IO device.

Referring now to FIG. 22, the IO device 210 has been inserted into the sternum puck 130, and subsequently removed by the trainee 200. A catheter 212 remains protruding from the sternum puck 130 as it would in a real world medical scenario. The trainee can then complete simulated fluid or medication delivery through the catheter 212 as required by a given scenario.

Figure 23:
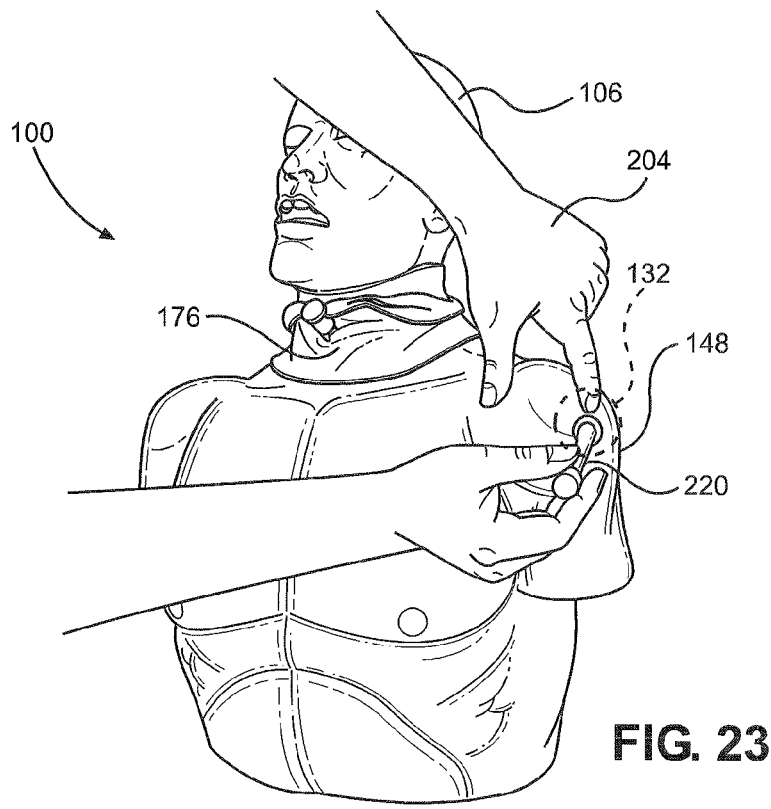
FIG. 23 is a perspective view of the preferred embodiment of the TCCC of previous embodiments showing utilization of the anatomically correct features of the TCCC to visually and manually identify anatomical landmarks to facilitate proper humeral IO device placement at the proximal humerus during training.

Referring now to FIG. 23, trainee 200 is using his hand 204 to palpate the left shoulder 148 for introduction of an IO device 220 to the humeral puck 132 (shown in dashed lines). This is completed in an identical fashion as a similar, real world IO device would be inserted into the proximal humeral head 131 or 133 of a patient in distress. The trainee 200 again palpates the shoulder of the TCCC 100 and uses appropriate landmarks to locate the humeral puck 132. The trainee 200 may then insert the IO device 220 into the humeral puck 132 as desired to complete a given medical procedure.

Figure 24:
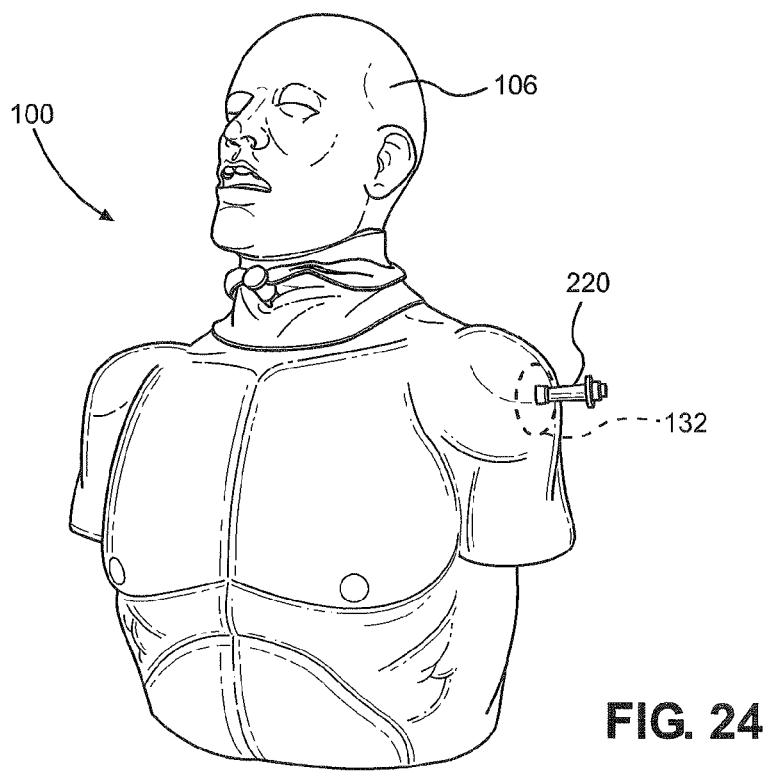
FIG. 24 is a perspective view of the preferred embodiment of the TCCC of FIG. 24 showing a humeral IO device applied to the left shoulder of the TCCC, in addition to the tracheal intubation described in the Figures above.

Referring finally to FIG. 24, the TCCC 100 of the present invention is shown with an IO device 220 inserted into the humeral puck 132, simulating insertion into the left proximal humerus 131, allowing vascular access for supply of medication, blood, or other fluids.

While there have been shown what are presently considered to be preferred embodiments of the present invention, it will be apparent to those skilled in the art that various changes and modifications can be made herein without departing from the scope and spirit of the invention.

While there have been shown what are presently considered to be preferred embodiments of the present invention, it will be apparent to those skilled in the art that various changes and modifications can be made herein without departing from the scope and spirit of the invention.

What is claimed is:

1. A method of manufacturing a human-like training device, comprising the steps of:
   constructing a human-like skeleton structure comprising a torso having a plurality of rib intercostal voids and formed with a plurality of intraosseous target receivers, a flexible neck, and a skull having a nasal passage and an oral passage;
   placing a plurality of intraosseous targets into the plurality of intraosseous target receivers, wherein each intraosseous target comprises a layer of polystyrene covered by polycarbonate resin thermoplastic approximating actual human bone density without any hollow interiors to simulate an intraosseous injection site and configured to be received by the intraosseous target receivers, wherein the intraosseous target provides physical landmarks for the location of the intraosseous injection site;
   placing the human-like skeleton structure inside a skin mold;
   placing removable plugs into the nasal passage and the oral passage of the skull;
   sealing the plurality of rib intercostal voids with plastic resin sheets;
   filling the skin mold with a liquid to cast a human-like skin over the human-like skeleton structure and plurality of intraosseous targets; and
   removing the removable plugs to create void areas in the human-like skin adjacent the nasal passage and the oral passage.

2. The method of manufacturing a human-like training device of claim 1, wherein the liquid is a two-part, liquid silicone, tin-based polymer rubber.

3. The method of manufacturing a human-like training device of claim 1, comprising the additional step of:
   adding a membranous material to the plurality of rib intercostal voids, opposite from the plastic resin sheets and beneath the human-like skin to simulate a parietal pleura.

4. The method of manufacturing a human-like training device of claim 1, wherein the human-like skeleton structure further comprises a sternum having a sternum intraosseous target receiver, comprising the additional step of:
   attaching a sternum intraosseous target to the sternum intraosseous target receiver.

5. The method of manufacturing a human-like training device of claim 1, wherein the human-like skeleton structure further comprises a humeral head having a humeral head intraosseous target receiver, comprising the additional step of:
   attaching a humeral head intraosseous target to the humeral head intraosseous target receiver.

6. The method of manufacturing a human-like training device of claim 1, comprising the additional step of:
   forming a trachea module insertion area in the human-like skin adjacent the neck of the human-like skeleton structure.

7. The method of manufacturing a human-like training device of claim 6, wherein the torso of the human-like skeleton structure further comprises an interior cavity, comprising the additional step of:
   forming a hole in the top and bottom of the trachea module insertion area thereby allowing a continuous path from the skull to the interior cavity of the torso.

8. The method of manufacturing a human-like training device of claim 1, comprising the additional steps of:
   forming a tongue;
   affixing the tongue inside the oral passage.

9. The method of manufacturing a human-like training device of claim 8, wherein the tongue is made from a two-part liquid silicone to form a semi-rigid foam organ.

10. The method of manufacturing a human-like training device of claim 1, the training device further comprising a trachea module insertion area having a hole in the top of the insertion area and a hole in the bottom of the insertion area formed into the human-like skin and an internal area formed into the torso of the human-like skeleton structure, comprising the additional steps of:

forming a trachea module having a central lumen;
inserting the trachea module into the trachea module insertion area such that a continuous path is formed from the oral passage, through the central lumen, and to the internal area of the torso.

11. The method of manufacturing a human-like training device of claim 10, comprising the additional steps of:
installing a simulated neck skin such that the simulated neck skin covers the trachea module insertion area.

12. The method of manufacturing a human-like training device of claim 1, comprising the additional step of: forming the interior of the skull with specific pathways replicating an oral cavity, a palate, nasal passageways, an epiglottis, and an esophagus.

13. A method of manufacturing a human-like training device comprising the steps of:
constructing a human-like skeleton structure comprising a torso formed with a plurality of intraosseous target receivers, a neck, and a skull;
providing a plurality of intraosseous targets, wherein each intraosseous target comprises a solid layer of polystyrene covered by polycarbonate resin thermoplastic formed as a target approximating actual human bone density without any hollow interiors to simulate an intraosseous injection site and configured to be received by the intraosseous target receivers, wherein the target provides physical landmarks for the location of the intraosseous injection site;
placing each of the plurality of intraosseous targets into each of the corresponding plurality of intraosseous target receivers;
covering the human-like skeleton structure and plurality of intraosseous targets with a skin-like exterior, the skin-like exterior having a trachea module insertion area;
placing a trachea module into the trachea module insertion area; and
placing a neck skin over the trachea module insertion area of the skin-like exterior to cover the trachea module insertion area and the trachea module.

14. A method of manufacturing a human-like training device comprising the steps of:
providing a human-like skeleton structure comprising a torso formed with a plurality of intraosseous puck receivers, a neck, and a skull;
providing a plurality of removable intraosseous pucks, wherein each removable intraosseous puck consists of a solid puck-shaped layer of polystyrene covered by polycarbonate resin thermoplastic forming a puck approximating actual human bone density without any hollow interiors to simulate an intraosseous injection site and configured to be received by the intraosseous puck receivers, wherein the puck shape provides physical landmarks for the location of the intraosseous injection site;
placing each of the plurality of removable intraosseous pucks into each of the corresponding plurality of intraosseous puck receivers; and
covering the human-like skeleton structure and plurality of removable intraosseous pucks with a skin-like exterior.

* * * * *